United States Patent [19]

Raley, Jr. et al.

[11] 3,960,770

[45] June 1, 1976

[54] PROCESS FOR PREPARING MACROPOROUS OPEN-CELL CARBON FOAM FROM NORMALLY CRYSTALLINE VINYLIDENE CHLORIDE POLYMER

[75] Inventors: Charles F. Raley, Jr.; Delman R. Asher, both of Midland, Mich.

[73] Assignee: The Dow Chemical Company, Midland, Mich.

[22] Filed: July 25, 1974

[21] Appl. No.: 491,894

Related U.S. Application Data

[63] Continuation-in-part of Ser. No. 385,493, Aug. 3, 1973, abandoned, which is a continuation of Ser. No. 179,194, Sept. 7, 1971, abandoned.

[52] U.S. Cl. ............................... 252/444; 131/264; 131/269; 252/422; 260/2.5 HA; 423/445; 264/29; 423/449
[51] Int. Cl.² .................... B01J 21/18; B01J 31/10
[58] Field of Search .......... 252/422, 421, 444, 445; 423/445, 449; 264/29; 201/2.5, 25

[56] References Cited
UNITED STATES PATENTS

| | | | |
|---|---|---|---|
| 2,695,427 | 11/1954 | Sarge et al. | 260/2.5 R |
| 2,944,031 | 7/1960 | Mason | 252/421 |
| 3,258,363 | 6/1966 | Lieb | 423/449 |
| 3,342,555 | 9/1967 | McMillan | 252/444 |
| 3,516,791 | 6/1970 | Evans et al. | 252/421 |
| 3,852,429 | 12/1974 | Murayama et al. | 423/449 |

OTHER PUBLICATIONS

Kirk–Othmer – Encyclopedia of Chemical Technology – 2nd Edition vol. 21, 1970, pp. 294–295.

Tsuchida et al., *Journal of Polymer Science* – 1964 part A, vol. 2, pp. 3347–3354.

*Translations of the Faraday Society* – vol. 50, 1954, pp. 740–748; J. R. Dacey & D. G. Thomas.

*Primary Examiner*—Winston A. Douglas
*Assistant Examiner*—P. E. Konopka
*Attorney, Agent, or Firm*—Ronald G. Brookens

[57] ABSTRACT

Activated, macroporous open-cell carbon foam which is particularly useful as a filter for cigarette smoke and the like, is prepared by contacting, at a temperature of at least about 25°C a normally crystalline vinylidene chloride polymer in substantially open-cell, macroporous foam form with liquid ammonia until at least about 50 percent of theoretical Cl⁻ is removed, then heating said foam to a temperature sufficient to remove residual ammonium chloride.

4 Claims, No Drawings

PROCESS FOR PREPARING MACROPOROUS OPEN-CELL CARBON FOAM FROM NORMALLY CRYSTALLINE VINYLIDENE CHLORIDE POLYMER

This application is a continuation-in-part of application Ser. No. 385,493, filed Aug. 3, 1973 (now abandoned) which is a continuation of application Ser. No. 179,194, filed Sept. 7, 1971 (now abandoned).

BACKGROUND

The usual method of forming active (high-surface area) carbon from polymers is by anerobic pyrolysis. It has been found, however, that the object being carbonized shrinks during the process. This means that a desired shape cannot be carbonized with retention of configuration. The final carbon has very high specific surface area, but the surface is not easily accessible; a relatively slow diffusion through the pores is the only way for the absorbed species to be captured. Thus, visualizing a massive block of such carbon, there would be no free path for the passage of a gas or liquid current. For this reason, charcoal, e.g., when used as a filter for cigarettes, is used in granular form, where the gas travels through the interstices between granules and is adsorbed by diffusion laterally into the granule.

The most effective configuration would appear to be an open-cell carbon foam. Such foam can be made by pyrolysis of phenolic foams or balsa wood, but due to the extremely fine cells in the original material, are resistant to flow. If a polymer could be foamed to the proper cell structure, then carbonized, and ideal balance might be arrived at between specific surface area and low back-pressure. However, thermoplastic polymers do not retain the desired configuration during pyrolysis and thermoset polymers have undesirable cell structure.

It is also known to make active carbon by pyrolysis of vinylidene chloride polymers. However, such polymer decomposes while melting, liberating HCl gas and turning to a bubbling tar before becoming carbonized.

It is further known that vinylidene chloride polymers can be carbonized by reaction with strong bases, such as alkali metal amides in liquid ammonia solution. Such process is not desirable, however, as such strong bases leave a residue (metal chloride) in the pores of the foamed structure which is non-volatile at temperatures less than about 1500°C.

The present invention overcomes such disadvantage by utilization of specific foamed structures and liquid ammonia as the sole reactant wherein the only interstitial residue formed is $NH_4Cl$ which, in turn, may be easily removed by moderate heating to its decomposition temperature (at 350°C.).

SUMMARY

It has now been discovered, which discovery represents the present invention, that activated carbon in substantially open-cell, macroporous foam form, which is particularly useful as a filter for gas such as cigarette smoke and the like, can be prepared by (1) contacting, at a temperature of at least about 25°C., a normally crystalline vinylidene chloride polymer in substantially open-cell, macroporous foam form with liquid ammonia as the sole reactant until at least about 50 percent of theoretical $Cl^-$ is removed, then (2) heating said foamed activated carbon to a temperature sufficient to remove residual ammonium chloride.

DESCRIPTION OF THE PREFERRED EMBODIMENTS

The vinylidene chloride polymers useful in the present invention are the normally crystalline materials containing at least about 70 percent by weight of vinylidene chloride with the remainder being composed of one or more monoethylenically unsaturated comonomers exemplary of which are vinyl chloride, vinyl acetate, vinyl propionate, acrylo-nitrile, alkyl and aralkyl acrylates having alkyl and aralkyl groups of up to about 8 carbon atoms, acrylic acid, acryla-mide, vinyl alkyl ethers, vinyl alkyl ketones, acrolein, allyl esters and ethers, butadiene and chloroprene. Known ternary compositions also may be employed advantageously. Representative of such polymers are those composed of at least 70 percent by weight of vinylidene chloride with the remainder made up of, for example acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate or vinyl chloride, allyl esters or ethers and vinyl chloride, butadiene and vinyl acetate, vinyl propionate, or vinyl chloride and vinyl ethers and vinyl chloride. Quarternary polymers of similar monomeric compositions will also be known.

The preparation of foamed structures from such vinylidene chloride polymers may be accomplished by any known procedures, e.g., as disclosed by U.S. Pat. No. 2,695,427 issued Nov. 30. 1954, or by U.S. Pat. No. 3,491,033 issued Jan. 20, 1970 or by extrusion of a normally crystalline vinylidene chloride polymer containing a heat degradable blowing agent. It is preferred, as indicated supra, that the foamed vinylidene chloride polymer have an open or interlocking cell structure for preparation of carbon structures having optimum utility as filter materials for gases, such as cigarette smoke and liquids or for use as a catalyst bed or catalyst support. Particularly useful are the macroporous, open-cell foam structures wherein the average cell diameter is in the order of at least about 0.01 millimeter.

It has now been discoverd that the normally crystalline vinylidene chloride polymer foam structures can be treated with liquid ammonia to form carbon structures having essentially the same configuration as the starting vinylidene chloride polymer foam. When treating the normally crystalline vinylidene chloride polymer foam with liquid ammonia, the foam must be maintained at a temperature of at least about 0°C. up to a temperature of about 130°C., and preferably from about 25°C. to about 100°C. for periods sufficient to remove at least about 50 percent of theoretical $Cl^-$ from the starting polymer. Utilization of temperatures less than about 25°C. are insufficient for obtaining a practical rate of $Cl^-$ evolution, whereas utilization of temperatures in excess of about 100°C. requires the use of extremely high pressures to maintain the ammonia in a liquid state.

The following examples are intended to illustrate the present invention, but are not to be construed as limiting its scope:

EXAMPLE 1

In each of a series of experiments individual samples of a substantially open-cell, macroporous normally crystalline vinylidene chloride polymer foam were treated with liquid ammonia to carbonize the foam structure. The starting foam was prepared from a copolymer of about 85 percent by weight vinylidene chloride and about 15 percent by weight of vinyl chloride and containing about 5 parts by copolymer weight of the heat degradable blowing agent azodicarbonamide. The following Table I sets forth the amounts of materials used, the reaction conditions and the amount of $Cl^-$ removed.

TABLE I

| Exp. No. | Wt. Of Polymer Foam (gms.) | Reaction Conditions Time (hrs.) | Temp. (°C.) | %$Cl^-$ Removed |
|---|---|---|---|---|
| 1 | 1.25 | 4 | 25 | 61.8 |
| 2 | 1.32 | 8 | 25 | 70.2 |
| 3 | 1.04 | ½ | 50 | 66.2 |
| 4 | 1.29 | 1 | 50 | 75.0 |
| 5 | 1.31 | 4 | 50 | 81.7 |
| 6 | 1.32 | ½ | 100 | 80.9 |
| 7 | 1.24 | 1 | 100 | 83.0 |
| 8 | 1.43 | 4 | 100 | 83.3 |

All of the above products were black, activated, open-cell macroporous carbon foams wherein the average cell diameter was at least about 0.01 millimeter. These foams, after being heated briefly at a temperature of about 350°C. to decompose (and remove) any residual ammonium chloride, are particularly effectie as filters for gases, such as cigarette smoke, and for effective as a catalyst bed or catalyst support.

EXAMPLE 2

To a 7 cc Pyrex bomb containing 1 gram (20 meq.) of a resinous copolymer of 85 percent by weight vinylidene chloride and 15 percent by weight vinyl chloride, in bead form, was added 0.5 gram (22 meq.) of liquid ammonia. The bomb was heated at 90°C. for 66 hours. After cooling and opening the bomb, the product was extracted thoroughly with water. Titration of the extract with $AgNO_3$ solution showed 17.8 meq. of $Cl^-$, equivalent to 94 percent of theory. The product was black in color and had the same physical structure as the starting copolymer.

In a similar experiment, a separate 5 gram sample (100 meq.) of the same vinylidene chloride-vinyl chloride copolymer was mixed with 3 grams (132 meq.) of liquid ammonia and allowed to stand at 25°C. for 66 hours. Titration of the extract with $AgNO_3$ (following water washing of the product formed) showed 55.9 meq. of $Cl^-$, which was equivalent to 55.9% of theory. Again, the product was black in color and had the same physical structure as the starting copolymer.

In another similar experiment, a sample of polyvinyl chloride foam was treated with excess liquid ammonia in a pressure vessel at 25°C. for 40 hours. The vessel was then heated to 100°C. After a 24 period the bomb was observed to have burst, but the foam had darkened only slightly to a buff color. It was apparent that this foam had not reacted in the same manner as the normally crystalline vinylidene chloride polymer foam materials.

EXAMPLE 3

In each of a series of experiments individual samples of a substantially open-cell, macroporous foam (wherein each cell had a diameter of at least about 0.01 millimeter) which foam was prepared from a copolymer of 85 percent by weight vinylidene chloride and 15 percent by weight vinyl chloride containing 5 parts by weight of the heat degradable blowing agent azodicarbonamide, were immersed in liquid ammonia in a Dewar flask under atmospheric pressure for a period of 4 to 8 hours. Following such immersion, the foam sample was placed in a Soxhlet extractor wherein deionized water was refluxed over the sample for a period of 2 hours. The ammonia was then flashed off using a gentle nitrogen flow. The residue from the Dewar flask and the water from the Soxhlet extractor were combined and a portion thereof titrated with N/100 $AgNO_3$ for $Cl^-$ determination. The following table identifies the foam samples tested and the % $Cl^-$ removed by treatment wih liquid ammonia as the sole reactant under atmospheric pressure.

TABLE

| Exp. No. | Wt. of Polymer Foam (gms.) | Reaction Conditions Time (hrs) | Temp. (°C.) | % $Cl^-$ Removed |
|---|---|---|---|---|
| (For comparison) 9 | 2.1688 | 4 | −33 | 0.29 |
| 10 | 2.1917 | 8 | −33 | 2.2 |

The above data illustrate that reaction of the designated vinylidene chloride copolymer foam with liquid ammonia under atmospheric pressure (with a corresponding temperature of −33°C.) is not practical for bringing about removal therefrom of at least about 50 percent of theoretical $Cl^-$ as required by the present invention.

What is claimed is:

1. A process for preparing substantially open-cell, macroporous foamed activated carbon said process consisting essentially of (1) contacting, at a temperature of about 25°C. to about 100°C., a normally crystalline vinylidene chloride polymer in substantially open-cell, macroporous foam form with ammonia in liquid form as the sole reactant until at least about 50 percent of theoretical $Cl^-$ is removed, then (2) water extracting the reaction product of step (1) to recover a foamed activated carbon, and (3) heating said foamed activated carbon to a temperature up to about 350°C. sufficient to remove residual ammonium chloride.

2. The process of claim 1 wherein said vinylidene chloride polymer is a copolymer of vinylidene chloride and vinyl chloride.

3. The process of claim 2 wherein said vinylidene chloride polymer is a copolymer of about 85 weight percent vinylidene chloride and about 15 weight percent vinyl chloride.

4. A substantially open-cell activated carbon foam wherein the average cell diameter is at least about 0.01 millimeter, said carbon foam being prepared by the process of Claim 1.

* * * * *